(12) United States Patent
Cui et al.

(10) Patent No.: US 11,542,179 B1
(45) Date of Patent: Jan. 3, 2023

(54) SYSTEM AND METHOD FOR REGULATING AND ABSORBING TFT-LCD ORGANIC SOLVENT WASTE LIQUID IN COUNTERCURRENT

(71) Applicant: Hefei University of Technology, Hefei (CN)

(72) Inventors: Kangping Cui, Hefei (CN); Jinjuan Ni, Hefei (CN); Yihan Chen, Hefei (CN); Zhi Guo, Hefei (CN); Hongzhi Zhang, Hefei (CN); Yongjie Yang, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 17/744,651

(22) Filed: May 14, 2022

(30) Foreign Application Priority Data

Jul. 1, 2021 (CN) .......................... 202110746108.5

(51) Int. Cl.
*C02F 1/28* (2006.01)
*B01J 20/20* (2006.01)
(Continued)

(52) U.S. Cl.
CPC .............. *C02F 1/283* (2013.01); *B01D 29/52* (2013.01); *B01D 36/00* (2013.01); *B01D 37/00* (2013.01);
(Continued)

(58) Field of Classification Search
CPC ...... C02F 1/283; C02F 1/008; C02F 2101/30; C02F 2201/005; C02F 2303/16;
(Continued)

(56) References Cited

U.S. PATENT DOCUMENTS

| 3,436,343 A * | 4/1969 | Smith ..................... C02F 1/283 210/90 |
| 2002/0063088 A1* | 5/2002 | Hidaka ..................... C02F 1/42 210/263 |

(Continued)

FOREIGN PATENT DOCUMENTS

| CN | 101420992 A | 4/2009 |
| CN | 104923031 A | 9/2015 |

(Continued)

OTHER PUBLICATIONS

CNIPA, Notification of a First Office Action for CN202110746108.5, dated Nov. 26, 2021.
(Continued)

*Primary Examiner* — Joseph W Drodge
(74) *Attorney, Agent, or Firm* — Hemisphere Law, PLLC; Zhigang Ma (57) ABSTRACT

A system and method for regulating and absorbing TFT-LCD organic solvent waste liquid in countercurrent are provided. In the system, each of longitudinal offset pipes of absorbing pipes is disposed between a lower filter plate and an upper filter plate, bottom positions of the longitudinal offset pipes are connected with a sinking-recovery pipe, each longitudinal offset pipe is provided with a photoelectric detector, an activated carbon supply pipe is provided with an activated carbon supply device, the sinking-recovery pipe is connected with a solid-liquid separator, and a wet activated carbon conduction mechanism is provided with a heating-separating device. Activated carbon particles in the absorbing pipe with a certain saturation amount are led out in a non-disassembly-replacement method, the saturated activated carbon is subjected to solid-liquid separating and heating degassing, thus the saturated organic solvent is
(Continued)

separated and recovered and the activated carbon particles are recycled.

10 Claims, 4 Drawing Sheets

(51) Int. Cl.
*B01D 29/52* (2006.01)
*B01D 36/00* (2006.01)
*B01D 37/00* (2006.01)
*C02F 1/00* (2006.01)
*C02F 101/30* (2006.01)

(52) U.S. Cl.
CPC ............... *B01J 20/20* (2013.01); *C02F 1/008* (2013.01); *C02F 2101/30* (2013.01); *C02F 2201/005* (2013.01); *C02F 2303/16* (2013.01)

(58) Field of Classification Search
CPC .. C02F 1/001; C02F 1/004; C02F 1/02; C02F 1/04; C02F 2103/34; C02F 2103/36; C02F 2209/10; C02F 2301/04; C02F 2301/043; B01J 20/20; B01J 20/34; B01J 20/3416; B01J 20/3425; B01J 20/3483; B01D 5/006; B01D 5/0072; B01D 29/50; B01D 29/52; B01D 29/56; B01D 29/88; B01D 29/90; B01D 29/92; B01D 35/00; B01D 36/00; B01D 37/00; B01D 2029/033
See application file for complete search history.

(56) References Cited

U.S. PATENT DOCUMENTS

| | | | | |
|---|---|---|---|---|
| 2003/0106855 A1* | 6/2003 | Kin | ............................ | C02F 1/78 210/748.15 |
| 2006/0096454 A1* | 5/2006 | Farant | ................ | B01J 20/28052 95/148 |
| 2007/0167309 A1* | 7/2007 | Olson | ................... | B01J 20/3475 502/28 |
| 2010/0187179 A1* | 7/2010 | Gaid | ........................ | C01B 32/36 210/201 |
| 2019/0039917 A1* | 2/2019 | Dahlberg | ................ | C02F 1/283 |
| 2019/0194035 A1* | 6/2019 | Mackay Pett | .......... | B01D 29/68 |
| 2020/0171409 A1* | 6/2020 | Cho | ........................ | B01J 20/3441 |
| 2021/0053027 A1* | 2/2021 | Oturan | ................. | B01J 20/2808 |
| 2021/0070643 A1* | 3/2021 | Gonzales | .................. | C02F 9/00 |

FOREIGN PATENT DOCUMENTS

| | | | | | |
|---|---|---|---|---|---|
| CN | 106563428 | A | | 4/2017 | |
| CN | 206500151 | U | | 9/2017 | |
| CN | 105800766 | B | * | 6/2018 | .............. C02F 1/104 |
| CN | 207429756 | U | | 6/2018 | |
| CN | 107512817 | B | * | 11/2018 | .............. C02T 1/004 |
| CN | 108862787 | A | * | 11/2018 | ................ C02F 9/00 |
| CN | 111617594 | A | | 9/2020 | |

OTHER PUBLICATIONS

Hefei University Of Technology (Applicant), Reply to Notification of a First Office Action for CN202110746108.5 w/ Replacement Claims, Drawings and Specification, dated Nov. 30, 2021.
CNIPA, Notification to grant patent right for invention for CN202110746108.5, dated Jan. 11, 2022.

* cited by examiner

SYSTEM AND METHOD FOR REGULATING AND ABSORBING TFT-LCD ORGANIC SOLVENT WASTE LIQUID IN COUNTERCURRENT

CROSS-REFERENCE TO RELATED APPLICATION

This disclosure claims priority to Chinese Patent Application No. 2021107461085, filed on Jul. 1, 2021, the contents of which are hereby incorporated by reference.

TECHNICAL FIELD

The disclosure belongs to the technical field of thin film transistor liquid crystal display (TFT-LCD) organic solvent treatment, and in particular to a system and method for regulating and absorbing TFT-LCD organic solvent waste liquid in countercurrent.

BACKGROUND

As the mainstream technology of flat panel display, high economic benefits have been achieved in TFT-LCD production, but meanwhile, a large amount of high-concentration polymer organic waste liquid has been produced. Therefore, environmental protection should be considered while achieving good economic benefits, so this part of production waste water must be treated considering its water quality characteristics.

In the organic waste liquid of TFT-LCD, there are many organic solvents that can be recycled, such as n-methylpyrrolidone (NMF), 2-(2-n-butoxyethoxy) ethanol (BDG), 1-amino-2-hydroxyethane, monoethanolamine (MEA), dimethyl sulfoxide (DMSO), 1-Methoxy-2-propyl acetate (PG-MEA), Tetramethyl ammonium hydroxide (TMAH), etc., all of which have high economic recovery value.

In TFT-LCD organic waste liquid treatment technology, adsorption is a common treatment method, and activated carbon particles are commonly used as adsorbents.

However, in the prior art, when activated carbon particles are used for adsorption, activated carbon is concentrated into filter bags or filter tubes. When adsorption is saturated, the activated carbon filter bags and filter tubes need to be manually replaced. In order to further recycle the organic solvent in the organic waste liquid of TFT-LCD, the saturated activated carbon bags should be treated. In the prior art, after the activated carbon adsorption is saturated or nearly saturated, the production efficiency of the saturated or nearly saturated activated carbon replacement and organic separation process is low, and there is human intervention, and some toxic and harmful organic waste liquid may be harmful to human body.

SUMMARY

The objective of the disclosure is to provide a system and method for regulating and absorbing TFT-LCD organic solvent waste liquid in countercurrent. Through non-disassembly-replacement method, the activated carbon particles in an absorption tube with a certain saturation amount are led out, and the saturated activated carbon is gradually subjected to solid-liquid and degassed by heating, the saturated organic solvent is separated and recovered, and the activated carbon particles can be recycled.

To solve the above technical problems, the disclosure is realized by the following technical schemes:

the disclosure relates to a system for regulating and absorbing TFT-LCD organic solvent waste liquid in countercurrent. In the system, the absorbing pipe is provided with a lower filter plate at the lower part thereof, and a lower water inlet cavity is arranged below the lower filter plate; the absorbing pipe is further provided with an upper filter plate at the upper part thereof, and an upper water outlet cavity is arranged above the upper filter plate; the absorbing pipe is provided with a longitudinal offset pipe between the lower filter plate and the upper filter plate, and the bottom positions of the longitudinal offset pipes of the plurality of absorbing pipes are connected with a sinking-recovery pipe in common; the bottom area of the longitudinal offset pipe is provided with a photoelectric detector for detecting the sinking accumulation of activated carbon; the upper area of the longitudinal offset pipe is connected with a branch pipe for supply for pressurized supply of activated carbon particles; the plurality of branch pipes for supply are connected with an activated carbon supply pipe in common; the upstream end of the activated carbon supply pipe is provided with an activated carbon supply device;

the lower water inlet cavity arranged under the absorbing pipe is connected with a liquid inlet pipe; the upper water outlet cavity is connected with a liquid outlet pipe; the downstream branches of the liquid outlet pipe include a first discharge pipe and a first reflux pipe; the downstream end of the first reflux pipe is connected with the liquid inlet pipe; the downstream end of the sinking-recovery pipe is connected with a solid-liquid separator; the solid-liquid separator includes a bleeder pipe for leading out liquid; the downstream branches of the bleeder pipe include a second discharge pipe and a second reflux pipe; the downstream end of the second reflux pipe is connected with the liquid inlet pipe; the solid-liquid separator includes a wet activated carbon conduction mechanism; a heating-separating device is arranged at the downstream end of the wet activated carbon conduction mechanism; the downstream end of the gaseous conduction structure of the heating-separating device is provided with a condensation recovery device; the heating-separating device includes a dry activated carbon conduction mechanism matched with the activated carbon supply device.

In an embodiment, the liquid inlet pipe is provided with a pressurized diversion device and a concentration detection device, the pressurized diversion device is located at the downstream position of the first concentration detection device.

In an embodiment, the bottom of the longitudinal offset pipe of each absorbing pipe is connected with a carbon-absorbing branch pipe; the downstream end of the carbon-absorbing branch pipe is connected with the sinking-recovery pipe; the carbon-absorbing branch pipe is provided with a solenoid valve for branch pipe; the sinking-recovery pipe is provided with a pressurized diversion device.

In an embodiment, the liquid outlet pipe and the bleeder pipe are provided with concentration detection devices respectively; the concentration detection device is located upstream of the branch point of the first discharge pipe and the first reflux pipe; the concentration detection device is located upstream of the branch point of the second discharge pipe and the second reflux pipe.

In an embodiment, pipeline solenoid valves are arranged at the position where the absorbing pipe is connected with the liquid inlet pipe and on the branch pipe for supply, the first discharge pipe, the first reflux pipe, the second discharge pipe and the second reflux pipe.

In an embodiment, the solid-liquid separator includes a lifting mechanism; a bottom filter plate is arranged in the lifting mechanism; a reflux liquid cavity is arranged below the bottom filter plate, and a lifting conductive belt is arranged above the bottom filter plate.

In an embodiment, the solid-liquid separator is internally provided with an exporting mechanism matched with the wet activated carbon conduction mechanism; the lifting conductive belt is obliquely arranged; and the upstream end of the exporting mechanism is located in the lower area of the upper end of the lifting conductive belt.

The disclosure relates to a method for regulating and absorbing TFT-LCD organic solvent waste liquid in countercurrent, which includes the following steps:

S1, injecting organic waste liquid into the liquid inlet pipe, and the concentration detection device on the liquid inlet pipe detects the concentration of organic solvents in the liquid inlet pipe;

S2, according to the organic solvent concentration detected by the concentration detector on the current liquid inlet pipe, the control system drives and controls the activated carbon supply device to pressurize and inject a corresponding amount of activated carbon particles into the absorbing pipe through the activated carbon supply pipe and the branch pipe for supply; after the corresponding amount of activated carbon particles are injected into the absorbing pipe, turning off the pipeline solenoid valve on the branch pipe for supply and the solenoid valve for branch pipe on the carbon-absorbing branch pipe;

S3, turning on the pipeline solenoid valve at the inlet of the lower end of the absorbing pipe connected with the liquid inlet pipe, injecting the waste liquid into the absorbing pipe upward through the pressurized diversion device, and discharging the waste liquid treated by activated carbon adsorption by the liquid outlet pipe at the upper end of the absorbing pipe;

S4, the concentration detection device on the liquid outlet pipe detects the organic solvent concentration of the waste liquid in the pipe in real time;

① when the concentration of organic solvent in the liquid outlet pipe is lower than the first threshold value preset by the control system, turning off the pipeline solenoid valve on the first reflux pipe and turning on the pipeline solenoid valve on the first discharge pipe to discharge the liquid;

② when the concentration of organic solvent in the liquid outlet pipe is not lower than the first threshold value preset by the control system and lower than the second threshold, turning on the pipeline solenoid valve on the first reflux pipe, and turning off the pipeline solenoid valve on the first discharge pipe, so that the liquid with substandard concentration flows back into the liquid inlet pipe through the first reflux pipe;

③ when the concentration of organic solvent in the liquid outlet pipe is not lower than the second threshold, turning off the pipeline solenoid valve at the lower end of the absorbing pipe, stopping the injection of new organic waste liquid, and letting the mixed liquid containing activated carbon particles in the absorbing pipe stand still; after standing for a certain period of time, the photoelectric detector in the absorbing pipe detects the amount of activated carbon particles deposited by standing still; if the current amount of activated carbon particles deposited by standing still in the absorbing pipe reaches the system reference threshold, turning on the solenoid valve for branch pipe on the carbon-absorbing branch pipe connected to the current absorbing pipe to suck off the activated carbon particles deposited by standing still at the bottom; after sucking off the precipitated activated carbon, turning off the solenoid valve for branch pipe; the activated carbon supply device injects the same amount of activated carbon particles into the absorbing pipe which sucks the precipitated activated carbon particles, and after replenishing the activated carbon particles in the absorbing pipe, turning on the pipeline solenoid valve at the lower end of the absorbing pipe again, and the organic waste liquid is injected into the absorbing pipe through the liquid inlet pipe;

S5, the activated carbon particles discharged by standing and precipitating in the absorbing pipe are transported to the solid-liquid separator through the sinking-recovery pipe, and the solid-liquid separator separates the mixture containing activated carbon and liquid, and discharges the liquid from below; the liquid is discharged through the bleeder pipe, and the wet activated carbon particles are conducted to the heating-separating device through the wet activated carbon conduction mechanism;

S6, heating the wet activated carbon particles by the heating-separating device, and the heating temperature is controlled above the boiling point of the highest boiling point component in the current organic mixed liquid components; evaporating the organic solvent and water in the wet activated carbon particles, and introducing the organic solvent and water into the condensation recovery device to gradually condense and recover the organic solvent; and S7, transmitting the dried activated carbon particles to the activated carbon supply device by the heating-separating device to circulate the activated carbon particles.

In an embodiment, when the activated carbon supply device injects activated carbon particles into the absorbing pipe, only the pipeline solenoid valve on the branch pipe for supply connected to one absorbing pipe is turned on.

In an embodiment, the concentration detection device on the bleeder pipe detects the concentration of the organic solvent in the liquid discharged by the solid-liquid separator;

① when the detected concentration is lower than the first threshold value, turning on the pipeline solenoid valve on the second discharge pipe, and turning off the pipeline solenoid valve on the second reflux pipe, and the liquid is discharged through the second discharge pipe;

② when the detected concentration is not lower than the first threshold value, turning off the pipeline solenoid valve on the second discharge pipe, and turning on the pipeline solenoid valve on the second reflux pipe, so that the liquid flows back to the liquid inlet pipe through the second reflux pipe.

The disclosure has the following beneficial effects:

According to the disclosure, on the premise of building a pipeline device capable of continuously injecting organic solvent waste liquid, a supplementary intervention mode of activated carbon particles is designed in an auxiliary way, and the adsorption saturation state of the activated carbon particles in the absorbing pipe is judged by taking concentration monitoring as a benchmark; through non-disassembly-replacement method, the activated carbon particles in the absorbing pipe with a certain saturation amount are led out, and the adsorbed saturated activated carbon is gradually solid-liquid and degassed by heating, so that the organic solvent which can be adsorbed and recovered in the organic waste liquid generated in each processing and manufacturing link of TFT-LCD can be recycled with high purity, and the activated carbon particles can also be recycled.

Of course, it is not necessary to achieve all the advantages mentioned above at the same time to implement any product of the present disclosure.

BRIEF DESCRIPTION OF THE FIGURES

In order to explain the technical scheme of the embodiments of the present disclosure more clearly, the following will briefly introduce the drawings needed for the description of the embodiments. Obviously, the drawings in the following description are only some embodiments of the present disclosure. For those skilled in the art, other drawings could be obtained according to these drawing without any creative effort.

Figure 1:
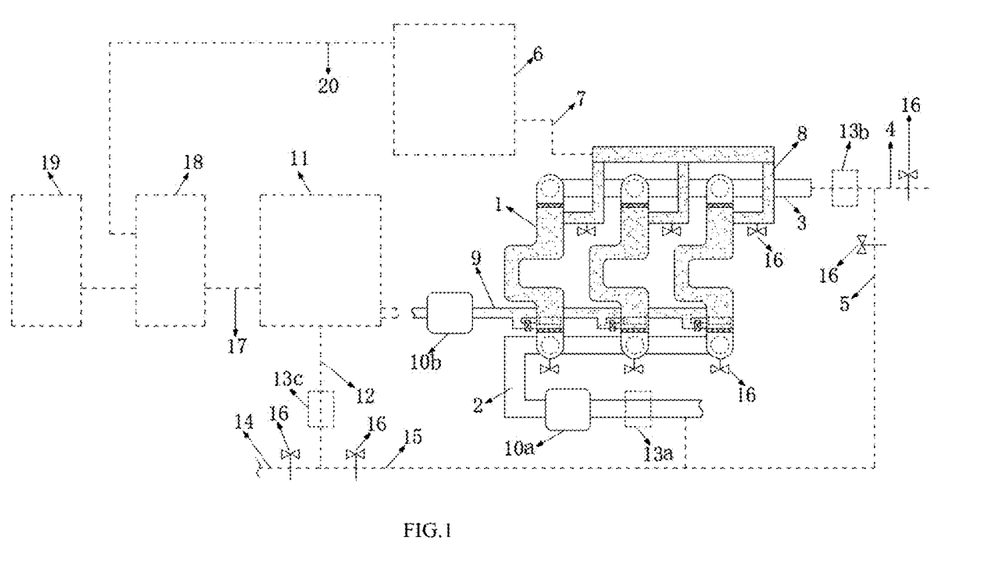
FIG. 1 is a schematic diagram of a system for regulating and absorbing TFT-LCD organic solvent waste liquid in countercurrent in the present disclosure.
Figure 2:
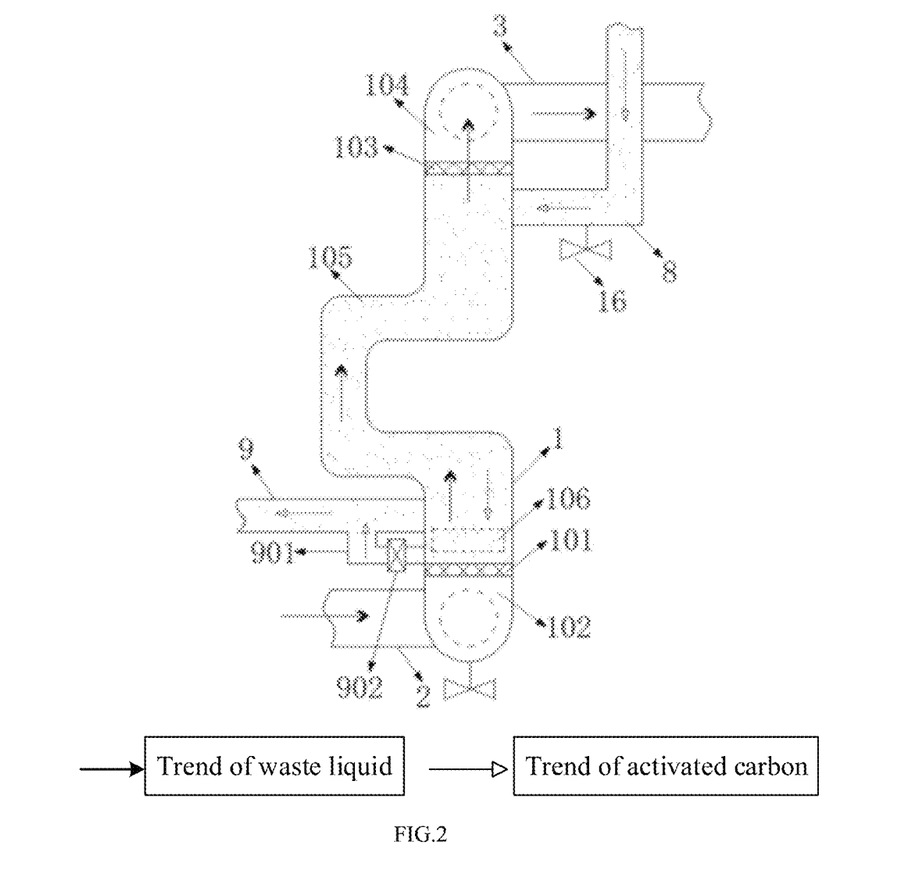
FIG. 2 is a schematic structural diagram of an absorbing pipe and related components in the present disclosure.
Figure 3:
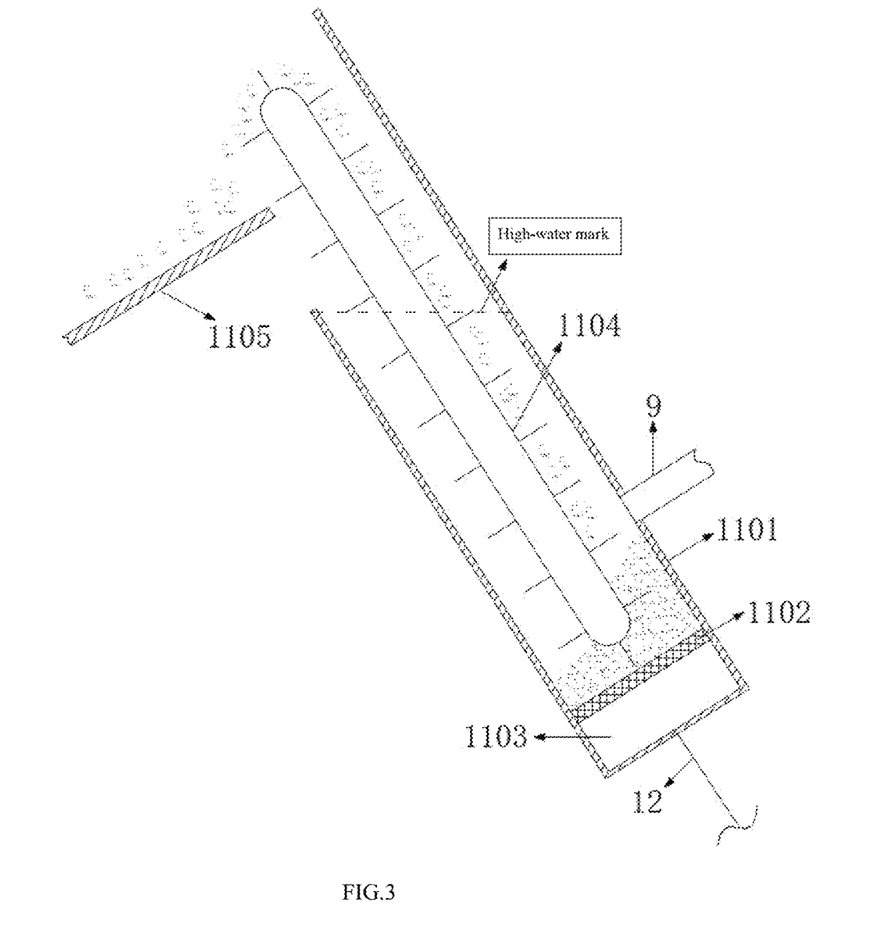
FIG. 3 is a schematic structural diagram of the lifting mechanism in the solid-liquid separator of the present disclosure.

In the drawings, the list of components represented by each reference number is as follows:

1—Absorbing pipe; 2—Liquid inlet pipe; 3—Liquid outlet pipe; 4—first discharge pipe; 5—First reflux pipe; 6—Activated carbon supply device; 7—Activated carbon supply pipe; 8—Branch pipe for supply; 9—Sinking-recovery pipe; 10a—First pressurized diversion device, 10b—Second pressurized diversion device; 11—solid-liquid separator; 12—Bleeder pipe; 13a—First concentration detection device, 13b—Second concentration detection device, 13c—Third concentration detection device; 14—Second bleeder pipe; 15—Second reflux pipe; 16—Pipeline solenoid valve; 17—Wet activated carbon conduction mechanism; 18—heating-separating device; 19—Condensation recovery device; 20—Dry activated carbon conduction mechanism;

101—Lower filter plate; 102—Lower water inlet cavity; 103—Upper filter plate; 104—Upper water outlet cavity; 105—Longitudinal offset pipe; 106—Photoelectric detector; 901—Carbon-absorbing branch pipe; 902—Solenoid valve for branch pipe; 1101—Lifting mechanism; 1102—Bottom filter plate; 1103—Reflux liquid cavity; 1104—Lifting conductive belt and 1105—Exporting mechanism.

DETAILED DESCRIPTION OF THE EMBODIMENTS

The technical solutions in the embodiments of the present disclosure will be clearly and completely described below with reference to the drawings in the embodiments of the present disclosure. Obviously, the described embodiments are only part of the embodiments of the present disclosure, but not all of them. Based on the embodiment of the present disclosure, all other embodiments obtained by those skilled in the art without creative labor are within the scope of the present disclosure.

Embodiment 1

In the countercurrent regulation and absorption system of the disclosure.

The absorbing pipe 1 is provided with a lower filter plate 101 at the lower part thereof, and a lower water inlet cavity 102 is arranged below the lower filter plate 101; the absorbing pipe 1 is further provided with an upper filter plate 103 at the upper part thereof, and an upper water outlet cavity 104 is arranged above the upper filter plate 103.

The absorbing pipe 1 is provided with a longitudinal offset pipe 105 between the lower filter plate 101 and the upper filter plate 103, and the bottom positions of the longitudinal offset pipes 105 of the plurality of absorbing pipes 1 are connected with a sinking-recovery pipe 9; the sinking-recovery pipe 9 is provided with a second pressurized diversion device 10b.

The carbon-absorbing branch pipe 901 is connected to the bottom of the longitudinal offset pipe 105; the downstream end of the carbon-absorbing branch pipe 901 is connected to the sinking-recovery pipe 9, and a solenoid valve for branch pipe 902 is arranged on the carbon-absorbing branch pipe 901.

The liquid inlet pipe 2 is connected with the lower water inlet chamber 102 at the lower part of the absorbing pipe 1; the liquid outlet pipe 3 is connected with the upper water outlet cavity 104 at the upper part of the absorbing pipe 1. A first discharge pipe 4 and a first reflux pipe 5 are arranged downstream of the liquid outlet pipe 3, and the first reflux pipe 5 is connected with the liquid inlet pipe 2.

Embodiment 2

Based on Embodiment 1, the countercurrent regulation and absorption system of the present disclosure relates to a solid-liquid separator 11.

The solid-liquid separator 11 is located at the downstream end of the sinking-recovery pipe 9. The lower side of the solid-liquid separator 11 is provided with a bleeder pipe 12 which leads out liquid. The downstream of the bleeder pipe 12 is provided with a second discharge pipe 14 and a second reflux pipe 15, and the downstream end of the second reflux pipe 15 is connected with the liquid inlet pipe 2.

The solid-liquid separator 11 is connected with a heating-separating device 18 through a wet activated carbon conduction mechanism 17; the downstream end of the heating-separating device 18 is connected with a condensation recovery device 19; the heating-separating device 18 is connected with the activated carbon supply device 6 through a dry activated carbon conduction mechanism 20.

A lifting mechanism 1101 is arranged in the solid-liquid separator 11; a bottom filter plate 1102 is arranged in the lifting mechanism 1101, and a reflux liquid cavity 1103 is arranged below the bottom filter plate 1102. A lifting conductive belt 1104 is arranged above the bottom filter plate 1102. The solid-liquid separator 11 is provided with an exporting mechanism 1105 matched with the wet activated carbon conducting mechanism 17; the lifting conductive belt 1104 is obliquely arranged, and the upstream end of the exporting mechanism 1105 is located in the lower area of the upper end of the lifting conductive belt 1104.

Embodiment 3

Based on Embodiment 1 and Embodiment 2, in the countercurrent regulation and absorption system of the disclosure:

the bottom area of the longitudinal offset pipe 105 is provided with a photoelectric detector 106 for detecting the sinking accumulation amount of activated carbon;

the upper area of the longitudinal offset pipe 105 is connected with a branch pipe for supply 8 for pressurized supply of activated carbon particles; the plurality of branch pipes for supply 8 are connected with an activated carbon supply pipe 7 in common; the upstream end of the activated carbon supply pipe 7 is provided with an activated carbon supply device 6.

A first pressurized diversion device 10a is arranged at the pipeline position where the liquid inlet pipe 2 needs diversion drive, and a second pressurized diversion device 10b is arranged at the pipeline position where the sinking-recovery pipe 9 needs diversion drive.

A first concentration detection device 13a is arranged on the liquid inlet pipe 2, and a second concentration detection device 13b is arranged on the liquid outlet pipe 3, and a third concentration detection device 13c is arranged on the second reflux pipe 15. The first concentration detection device 13a on the liquid inlet pipe 2 is located at the upstream position of the first pressurized diversion device 10a, which is convenient for concentration detection first, and then the diversion pressure of the first pressurized diversion device 10a is adjusted according to the actual initial concentration to control the flow rate. In order to better monitor the flow rate, the liquid inlet pipe 2 can be equipped with a flowmeter or a tachometer.

The pipeline solenoid valves 16 are arranged at the position where the absorbing pipe 1 is connected to the liquid inlet pipe 2, and on the branch pipe for supply 8, the first discharge pipe 4, the first reflux pipe 5, the second discharge pipe 14, and the second reflux pipe 15.

Embodiment 4

The disclosure relates to a control system, which is used for monitoring, analyzing and controlling the running state and parameters of system equipment. In the control system, a first threshold value is preset to judge whether the adsorption treatment of waste liquid is thorough or not. The preset second threshold value (the second threshold value is greater than the first threshold value) is used to judge whether the adsorption effect of the active carbon in the current absorbing pipe 1 is obviously reduced. If the active carbon in the current absorbing pipe 1 is close to the saturated absorption state, the concentration of the waste liquid discharged from the liquid outlet pipe 3 will become obviously higher, and the second threshold value is used as a judgment standard.

Embodiment 5

Figure 4:
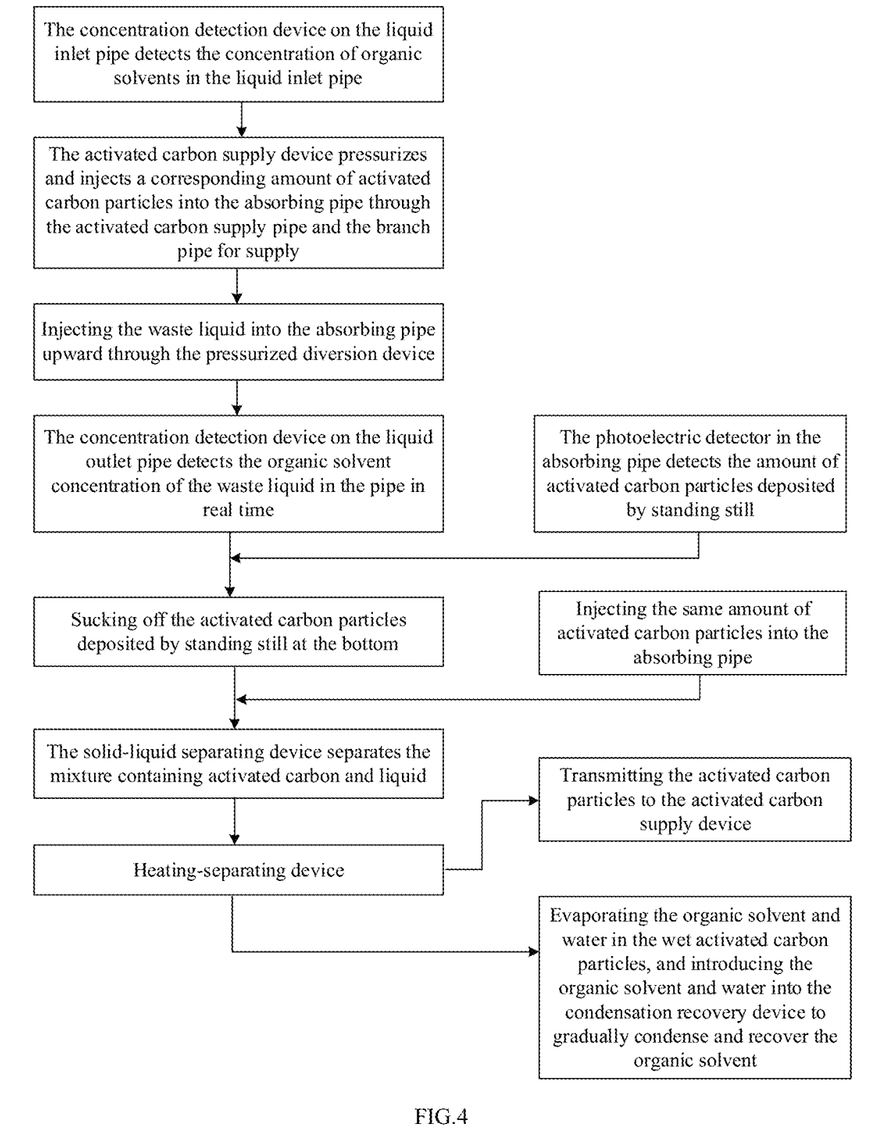
FIG. 4 is a partial flowchart of the system and method for regulating and absorbing TFT-LCD organic solvent waste liquid in countercurrent in the present disclosure.

Based on Embodiment 1, Embodiment 2, Embodiment 3, and Embodiment 4, the disclosure relates to a method for regulating and absorbing TFT-LCD organic solvent waste liquid in countercurrent, which specifically includes the following steps:

First, organic waste liquid is injected into the liquid inlet pipe 2, and the first concentration detection device 13a on the liquid inlet pipe 2 detects the concentration of organic solvent in the liquid inlet pipe 2. The first concentration detection device 13a on the current liquid inlet pipe 2 detects the organic solvent concentration of the liquid in the liquid inlet pipe 2, and the control system drives and controls the activated carbon supply device 6 to pressurize and inject a corresponding amount of activated carbon particles into the absorbing pipe 1 through the activated carbon supply pipe 7 and the branch pipe for supply 8 according to the organic solvent concentration. After the activated carbon particles are injected and quantified into the absorbing pipe 1, the pipeline solenoid valve 16 on the branch pipe for supply 8 and the solenoid valve for branch pipe 902 on the carbon-absorbing branch pipe 901 are turned off.

Second, the pipeline solenoid valve 16 at the inlet of the lower end of the absorbing pipe 1 connected to the liquid inlet pipe 2 is turned on, and the waste liquid is injected upward into the absorbing pipe 1 through the first pressurized diversion device 10a, and the waste liquid treated by activated carbon adsorption is discharged from the liquid outlet pipe 3 at the upper end of the absorbing pipe 1.

The second concentration detection device 13b on the liquid outlet pipe 3 detects the concentration of the organic solvent in the waste liquid in the pipe in real time, and after detecting the concentration, pipeline control is performed, specifically including the following contents:
① when the concentration of organic solvent in the liquid outlet pipe 3 is lower than the first threshold preset by the control system, turning off the pipeline solenoid valve 16 on the first reflux pipe 5 and turning on the pipeline solenoid valve 16 on the first discharge pipe 4 to discharge the liquid;
② when the concentration of organic solvent in the liquid outlet pipe 3 is not lower than the first threshold preset by the control system and lower than the second threshold, turning on the pipeline solenoid valve 16 on the first reflux pipe 5, and turning off the pipeline solenoid valve 16 on the first discharge pipe 4, so that the liquid with substandard concentration flows back into the liquid inlet pipe 2 through the first reflux pipe 5; ③ when the concentration of organic solvent in the liquid outlet pipe 3 is not lower than the second threshold, turning off the pipeline solenoid valve 16 at the lower end of the absorbing pipe 1, stopping the injection of new organic waste liquid, and letting the mixed liquid containing activated carbon particles in the absorbing pipe 1 stand still (when the activated carbon is put into water or solution, as the liquid molecules adsorbed by the activated carbon gradually reach saturation state, the activated carbon's weight will increase and it will gradually sink to the bottom of the water or the bottom of the mixed solution); after standing for a certain period of time, the photoelectric detector 106 in the absorbing pipe 1 detects the amount of activated carbon particles deposited by standing still; if the current amount of activated carbon particles deposited by standing still in the absorbing pipe 1 reaches the system reference threshold, turning on the solenoid valve for branch pipe 902 on the carbon-absorbing branch pipe 901 connected to the current absorbing pipe 1 to suck off the activated carbon particles deposited by standing still at the bottom; after sucking off the precipitated activated carbon, turning off the solenoid valve for branch pipe 902; the activated carbon supply device 6 injects the same amount of activated carbon particles into the absorbing pipe 1 which sucks the precipitated activated carbon particles (when the activated carbon supply device 6 injects activated carbon particles into the absorbing pipe, only the pipeline solenoid valve 16 on the branch pipe for supply 8 connected to one absorbing pipe 1 is turned on); after replenishing the activated carbon particles in the absorbing pipe 1, turning on the pipeline solenoid valve 16 at the lower end of the absorbing pipe 1 again, and the organic waste liquid is injected into the absorbing pipe 1 through the liquid inlet pipe 2;

Then, the activated carbon particles discharged by standing and precipitating in the absorbing pipe 1 are transported to the solid-liquid separator 11 through the sinking-recovery pipe 9, and the solid-liquid separator 11 separates the mixture containing activated carbon and liquid, and discharges the liquid from below; the liquid is discharged through the bleeder pipe 12. The third concentration detection device 13c on the bleeder pipe 12 detects the concentration of the organic solvent in the liquid discharged by the solid-liquid separator 11; ① when the detected concentration is lower than the first threshold value, turning on the pipeline solenoid valve 16 on the second discharge pipe 14, and turning off the pipeline solenoid valve 16 on the second reflux pipe 15, and the liquid is discharged through the second discharge pipe 14; ② when the detected concentration is not lower than the first threshold value, turning off the pipeline solenoid valve 16 on the second discharge pipe 14, and turning on the pipeline solenoid valve 16 on the second reflux pipe 15, so that the liquid flows back to the liquid inlet pipe 2 through the second reflux pipe 15.

The wet activated carbon particles are conducted to the heating-separating device 18 by the wet activated carbon conducting mechanism 17. The heating-separating device 18 heats the wet activated carbon particles, and the heating temperature is controlled above the boiling point of the highest boiling point component in the current organic mixed liquid components. The organic solvent and water in the wet activated carbon particles are evaporated and introduced into the condensation recovery device 19, and the organic solvent is gradually condensed and recovered. The heating-separating device 18 sends the dried activated carbon particles to the activated carbon supply device 6, and the activated carbon particles are circulated.

In the description of this specification, the description referring to the term "embodiment" or the like means that the specific features, structures, materials or characteristics described in connection with this embodiment or example are included in at least one embodiment or example of the present disclosure. In this specification, the schematic expressions of the above terms do not necessarily refer to the same embodiment or example. Furthermore, the specific features, structures, materials or characteristics described may be combined in any one or more embodiments or examples in a suitable manner.

The preferred embodiments of the disclosure disclosed above are only used to help explain the disclosure. The preferred embodiment does not describe all the details, nor does it limit the disclosure to the specific embodiment described. Obviously, many amendments and changes could be made according to the contents of this specification. These examples are selected and described in detail in this specification to better explain the principle and practical application of the disclosure, so that those skilled in the art could better understand and use the disclosure. The disclosure is limited only by the claims and their full scope and equivalents.

What is claimed is:

1. A system for regulating and absorbing thin film transistor liquid crystal display (TFT-LCD) organic solvent waste liquid, comprising:
    a plurality of independent absorbing pipes; wherein each of the plurality of absorbing pipes comprises:
    a lower filter plate, disposed at a lower part of the absorbing pipe;
    a lower water inlet cavity, arranged below the lower filter plate;
    an upper filter plate, disposed at an upper part of the absorbing pipe;
    an upper water outlet cavity, arranged above the upper filter plate;
    a longitudinal pipe, disposed between the lower filter plate and the upper filter plate; and
    a photoelectric detector, provided on a bottom area of the longitudinal pipe and configured to detect a sinking accumulation of activated carbon;
    wherein the system further comprises:
    a sinking-recovery pipe, connected to the bottom area of the longitudinal pipe of each of the plurality of absorbing pipes;
    a plurality of branch pipes for supply, connected to upper areas of the longitudinal pipes respectively, and configured to pressurize a supply of activated carbon particles;
    an activated carbon supply pipe, connected to the plurality of branch pipes for supply;
    an activated carbon supply device, provided on an upstream end of the activated carbon supply pipe;
    a liquid inlet pipe, connected to the lower water inlet cavity of each of the plurality of absorbing pipes;
    a liquid outlet pipe, connected to the upper water outlet cavity of each of the plurality of absorbing pipes;
    wherein downstream branches of the liquid outlet pipe comprise a first discharge pipe and a first reflux pipe, wherein a downstream end of the first reflux pipe is connected to the liquid inlet pipe;
    a solid-liquid separator, connected to a downstream end of the sinking-recovery pipe; wherein the solid-liquid separator comprises a bleeder pipe, downstream branches of the bleeder pipe comprise a second discharge pipe and a second reflux pipe, a downstream end of the second reflux pipe is connected to the liquid inlet pipe, wherein the solid-liquid separator further comprises a wet activated carbon conduction mechanism;
    a heating-separating device, provided at a downstream end of the wet activated carbon conduction mechanism; and
    a condensation recovery device, provided at a downstream end of a gaseous conduction structure of the heating-separating device;
    wherein the heating-separating device comprises a dry activated carbon conduction mechanism matched with the activated carbon supply device.

2. The system for regulating and absorbing TFT-LCD organic solvent waste liquid according to claim 1, wherein the system further comprises:
    a first pressurized diversion device and a first concentration detection device, each provided on the liquid inlet pipe, and the first pressurized diversion device is located at a downstream area of the first concentration detection device.

3. The system for regulating and absorbing TFT-LCD organic solvent waste liquid according to claim 2, wherein the system further comprises:
    a plurality of carbon-absorbing branch pipes, connected to bottoms of the longitudinal pipe of each of the plurality of absorbing pipes respectively, and downstream ends of the plurality of carbon-absorbing branch pipes being connected to the sinking-recovery pipe;
    a plurality of solenoid valves, provided on the plurality of carbon-absorbing branch pipes respectively; and
    a second pressurized diversion device, provided on the sinking-recovery pipe.

4. The system for regulating and absorbing TFT-LCD organic solvent waste liquid according to claim 3, wherein the system further comprises:
    a second concentration detection device, provided on the liquid outlet pipe; and
    a third concentration detection device, provided on the bleeder pipe;
    wherein the second concentration detection device is located at an upstream location of a branch point of the first discharge pipe and the first reflux pipe, and the third concentration detection device is located at an upstream location of a branch point of the second discharge pipe and the second reflux pipe.

5. The system for regulating and absorbing TFT-LCD organic solvent waste liquid according to claim 1, wherein the system further comprises:
a plurality of pipeline solenoid valves, respectively arranged at a position of a connection between each of the plurality of absorbing pipes and the liquid inlet pipe, and on the plurality of branch pipes for supply, the first discharge pipe, the first reflux pipe, the second discharge pipe and the second reflux pipe.

6. The system for regulating and absorbing TFT-LCD organic solvent waste liquid according to claim 1, wherein the solid-liquid separator comprises:
a lifting mechanism;
a bottom filter plate, arranged in the lifting mechanism;
a reflux liquid cavity, arranged below the bottom filter plate; and a lifting conductive belt, arranged above the bottom filter plate.

7. The system for regulating and absorbing TFT-LCD organic solvent waste liquid according to claim 6, wherein the solid-liquid separator further comprises: a discharging mechanism cooperated with the wet activated carbon conduction mechanism; and
wherein the lifting conductive belt is obliquely arranged, and an upstream end of the discharging mechanism is located in a lower area of an upper end of the lifting conductive belt.

8. A method for regulating and absorbing TFT-LCD organic solvent waste liquid, wherein the method is adopted for the system for
regulating and absorbing TFT-LCD organic solvent waste liquid according to claim 1, and comprises:
injecting organic waste liquid into the liquid inlet pipe, and detecting an organic solvent concentration of the organic waste liquid in the liquid inlet pipe by a first concentration detection device on the liquid inlet pipe;
driving, according to the organic solvent concentration detected by the first concentration detector on the liquid inlet pipe, the activated carbon supply device by a control system to pressurize and inject a corresponding amount of activated carbon particles into one of the plurality of absorbing pipes through the activated carbon supply pipe and a respective one of the branch pipes for supply connected to the one of the plurality of absorbing pipes;
after the corresponding amount of activated carbon particles are injected into the one of the plurality of absorbing pipes, turning off a pipeline solenoid valve on the respective branch pipe for supply connected to the one of the plurality of absorbing pipes and turning off a branch pipe solenoid valve on a carbon-absorbing branch pipe connected to the one of the plurality of absorbing pipes;
turning on a pipeline solenoid valve at a connection inlet between a lower end of the one of the plurality of absorbing pipes and the liquid inlet pipe, injecting the organic waste liquid into the one of the plurality of absorbing pipes upward through a first pressurized diversion device, and discharging the organic waste liquid after adsorption treatment of the corresponding amount of activated carbon particles by the liquid outlet pipe at an upper end of the one of the plurality of absorbing pipes;
detecting an organic solvent concentration of the organic waste liquid in the liquid outlet pipe in real time by a second concentration detection device on the liquid outlet pipe;

turning off a pipeline solenoid valve on the first reflux pipe and turning on a pipeline solenoid valve on the first discharge pipe to discharge the organic waste liquid, in response to the organic solvent concentration in the liquid outlet pipe detected by the second concentration detector being lower than a first threshold value preset by the control system,
turning on a pipeline solenoid valve on the first reflux pipe and turning off the pipeline solenoid valve on the first discharge pipe to flow the organic waste liquid with lower than threshold value concentration back into the liquid inlet pipe through the first reflux pipe, in response to the organic solvent concentration in the liquid outlet pipe being not lower than the first threshold value preset by the control system and lower than a second threshold valve;
turning off the pipeline solenoid valve at a lower end of the one of the plurality of absorbing pipes to stop an injection of new organic waste liquid, and letting a mixed liquid including the activated carbon particles in the one of the plurality of absorbing pipes stand still, in response to the organic solvent concentration in the liquid outlet pipe being not lower than the second threshold;
after the standing still for a selected period of time, detecting an amount of the sinking accumulation of activated carbon after the standing still by a photoelectric detector located on the one of the plurality of absorbing pipes, and in response to the detected amount of the sinking accumulation of activated carbon in the one of the plurality of absorbing pipes detected by the photoelectric detector reaches a system reference threshold, turning on the branch pipe solenoid valve for the respective branch pipe on the carbon-absorbing branch pipe connected to the one of the plurality of absorbing pipes to suck off the sinking accumulation of activated carbon at a bottom of the one of the plurality of absorbing pipes;
after the sucking off the sinking accumulation of activated carbon, turning off the branch pipe solenoid valve, injecting a corresponding amount of activated carbon particles into the one of the plurality of absorbing pipes by the activated carbon supply device, and after replenishing the activated carbon particles in the one of the plurality of absorbing pipes, turning on the pipeline solenoid valve at the lower end of the one of the plurality of absorbing pipes again, and injecting organic waste liquid into the one of the plurality of absorbing pipes through the liquid inlet pipe;
transporting the sinking accumulation of activated carbon discharged from the one of the plurality of absorbing pipes to the solid-liquid separator through the sinking-recovery pipe, and performing solid-liquid separating on the sinking accumulation of activated carbon by the solid-liquid separator, discharging liquid separated from the sinking accumulation of activated carbon through the bleeder pipe, and transporting wet activated carbon particles separated from the sinking accumulation of activated carbon to the heating-separating device through the wet activated carbon conduction mechanism;
heating the wet activated carbon particles by the heating-separating device with a heating temperature being controlled above a boiling point of a highest boiling point component in the liquid to evaporate organic solvents and water in the wet activated carbon particles, and thereby obtaining dried activated carbon particles, and introducing the organic solvents and the water into the condensation recovery device to gradually condense and recover the organic solvents; and transmitting the dried activated carbon particles to the activated carbon supply device by the heating-separating device to perform circulation of activated carbon particles from the bleeder pipe to the activated carbon supply device.

9. The method for regulating and absorbing TFT-LCD organic solvent waste liquid according to claim 8, wherein when the activated carbon supply device injects the activated carbon particles into the one of the plurality of absorbing pipes, and turns on the pipeline solenoid valve on the branch pipe for supply connected to the one of the plurality of absorbing pipes.

10. The method for regulating and absorbing TFT-LCD organic solvent waste liquid according to claim 8, wherein the method further comprises:

detecting an organic solvent concentration of liquid led out by the solid-liquid separator by a third concentration detection device on the bleeder pipe;

turning on a pipeline solenoid valve on the second discharge pipe and turning off a pipeline solenoid valve on the second reflux pipe to discharge the liquid through the second discharge pipe, in response to the detected organic solvent concentration being lower than the first threshold value; and turning off the pipeline solenoid valve on the second discharge pipe and turning on the pipeline solenoid valve on the second reflux pipe to flow the liquid back to the liquid inlet pipe through the second reflux pipe, in response to the detected organic solvent concentration being not lower than the first threshold value.

* * * * *